United States Patent
Spirk

Patent Number: 5,676,288
Date of Patent: Oct. 14, 1997

[54] BICYCLE COVER

[76] Inventor: Jessica A. E. Spirk, 7890 Bringham Rd., Gates Mills, Ohio 44040

[21] Appl. No.: 582,877

[22] Filed: Jan. 14, 1996

[51] Int. Cl.$^6$ .................................. B62J 19/00
[52] U.S. Cl. ........................... 224/463; 150/167
[58] Field of Search .................. 150/167, 166; 280/288.4, 304.3; 224/463

[56] References Cited

U.S. PATENT DOCUMENTS

| | | | |
|---|---|---|---|
| 4,356,831 | 11/1982 | Adams | 150/167 |
| 4,715,646 | 12/1987 | Goffi et al. | 150/167 X |
| 5,062,560 | 11/1991 | Wasden | 150/167 X |
| 5,193,724 | 3/1993 | Robbins | 150/167 X |
| 5,372,169 | 12/1994 | Norton et al. | 150/167 |
| 5,520,584 | 5/1996 | Brown, III | 150/167 X |

FOREIGN PATENT DOCUMENTS

| 31207 | 12/1970 | Japan | 150/166 |
|---|---|---|---|

*Primary Examiner*—Renee S. Luebke
*Attorney, Agent, or Firm*—Vickers, Daniels & Young

[57] ABSTRACT

A portable protective cover for a bicycle adapted to be connected to the handlebars and seat of a bicycle. The protective cover is made of waterproof or water resistant materials to protect various bicycle components from the elements. The protective cover includes an elastic material design to secure the protective cover to the bicycle. The protective cover can include an integrated storage pouch to conveniently and compactly store the protective covering when not in use.

10 Claims, 3 Drawing Sheets

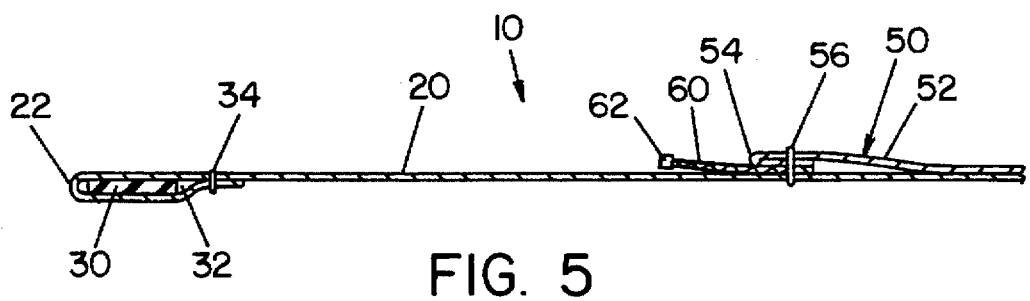
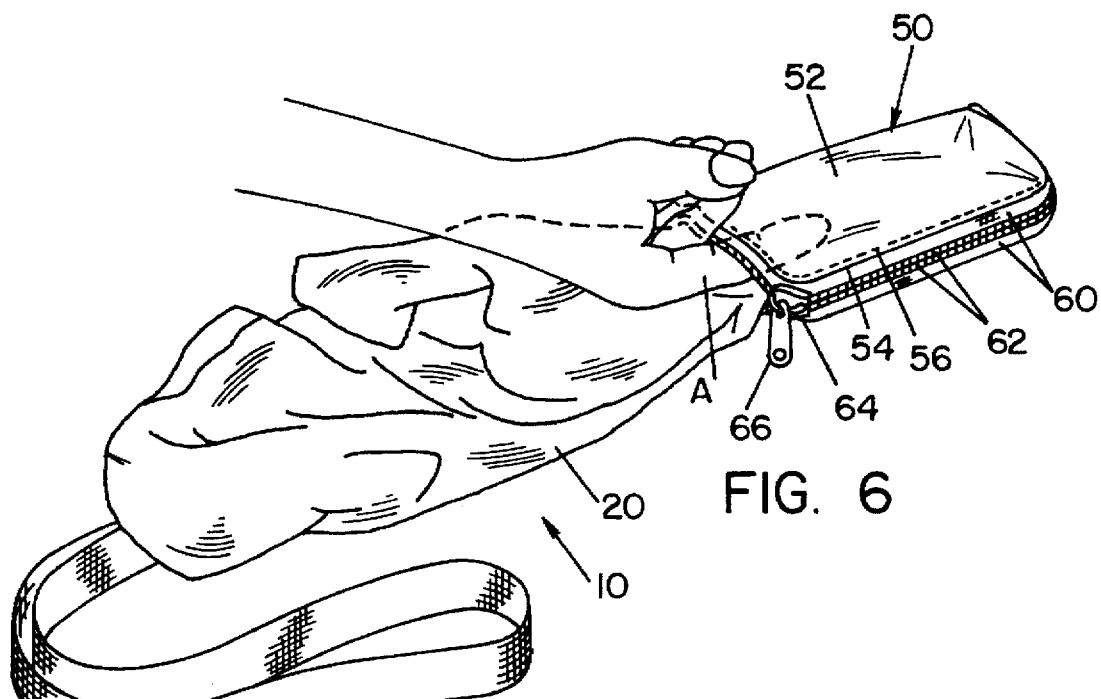
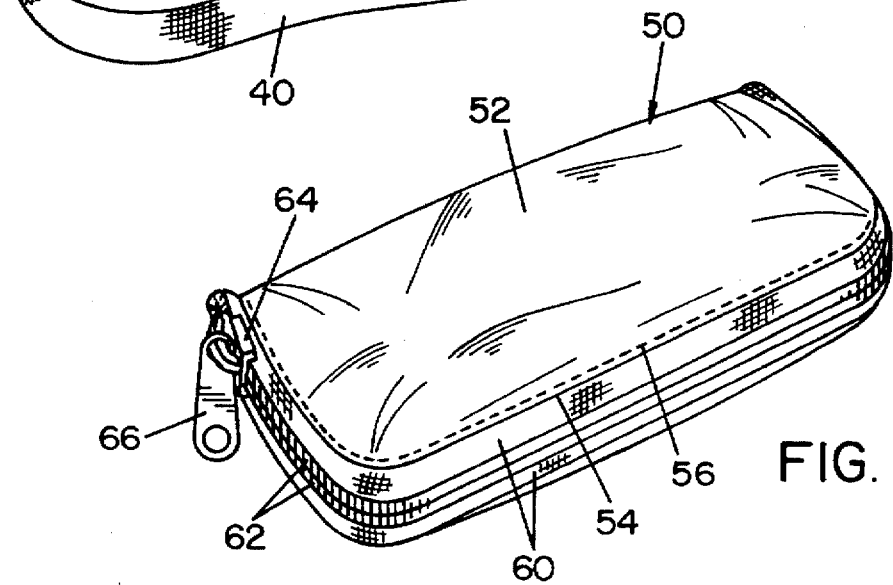

BICYCLE COVER

This invention relates to the art of protective devices and more particularly to a covering for a bicycle.

BACKGROUND OF THE INVENTION

The present invention is particularly applicable to protecting the seat and handle bars of a bicycle from the elements and will be discussed with particular reference thereto; however, the invention has broader applications and may be used to protect motorcycles or the like.

Bicycles have always been an alternative source of transportation in the United States. Over the past several years, the use of bicycles have increased due to the diverse designs available to the public for use in various types of road conditions. Bicycles are commonly used by city employees such as police to patrol areas inaccessible to or difficult to patrol by motor vehicle or on foot. Bicycles are also used by students to transport themselves to and from school. The increasing trend of college campuses to prohibit vehicles on the main campus and only allow pedestrians and bicycles has fueled the popularity of using bicycles on college campuses.

One of the inconveniences in using bicycles as a mode of transportation is the fact that the bicycle is exposed to the elements when stored on a bicycle rack or the like while the user is attending classes, eating lunch, or tending to other matters. As such, when it rains, snows or sleets, such rain, snow or sleet settles onto the handle bars and seat of the bicycle. This becomes very inconvenient to the user since the seat and the handle bars are the primary point of contact between the user and the bike. Furthermore, due to the advance in technology in the bike industry, various components such as the seat, the gears on the handle bars and the handle bars themselves can be adversely affected when exposed to rain, snow or ice. For instance, seats made of leather or a fabric material can be damaged when exposed to rain or ice. Brakes and gears located on the handle bars can become inoperable if ice settles or forms into such components. In addition to adverse weather conditions, pollutants in the air, bugs, bird droppings, etc. can damage or mess up the bicycle components when the bicycle is not in use.

In an effort to combat such problems, covers have been developed to completely cover the bike. However, such covers are difficult to attach and secure to the bicycle and furthermore, such covers are difficult, if not impossible, to be easily and compactly transported by the user. Due to the problems associated with bicycles being exposed to the elements and the lack of a convenient and suitable method for protecting the bicycle from such elements, there is a substantial need for a bicycle cover which can be easily attached to the handle bars and seat of a bicycle when the bicycle is not in use and can be conveniently stored by the user.

SUMMARY OF THE INVENTION

The present invention relates to a bicycle cover adapted to be connected to the handle bars and seat of a bicycle to protect such bicycle components from the elements when the bicycle is not in use.

In accordance with the preferred embodiment of the present invention, there is provided a protective covering for a bicycle which includes a flexible sheet member which is adapted to cover the seat and handle bars of a bicycle. The sheet member is preferably made up of a water resistant material so as to protect the handle bars and seat of the bicycle from water such as from rain and snow. The flexible sheet can be made of a variety of water resistant and flexible materials such as vinyl plastic, nylon, polyesters, waterproof canvas, etc. The flexible sheet preferably is made of a nylon or plastic material which has a thickness of about 1–10 mils so as to allow the material to be easily folded and stored when not in use. The material may be colored to exhibit various colors and patterns so as to appeal to a variety of user preferences.

Attached to the peripheral edge of the flexible sheet member is an elastic material. Preferably, the elastic material is connected about the complete peripheral edge of the flexible sheet member. The elastic material secures the flexible sheet to the handle bars and seat by the user stretching the elastic material about such bicycle components and releasing the material thereby allowing the elastic material to contract and be secured about the seat and handle bars. The elastic material is preferably sewed to the peripheral edge of the flexible member however, other methods of attaching the elastic material to the flexible sheet member can be employed.

In accordance with another feature of the present invention, the protective covering includes a security strap for securing the protective covering to the bicycle. Preferably, the security strap is connected to the flexible sheet member. The security strap is preferably designed of a strong material such as a nylon cord or a nylon strap which is sown to the flexible sheet member. The strap can be secured to the bicycle by the user applying a lock through the strap and attaching the lock to the bicycle thereby securing the strap to the bicycle. The security strap prevents an unauthorized user from easily stealing the protective cover. The security strap also prevents the protective cover from inadvertently being blown off the bicycle and lost when unexpectedly high winds cause the cover to be blown off the handle bars and/or the seat of the bicycle. Preferably, the security strap is attached to the peripheral edge of the sheet member and more preferably, the peripheral edge of the flexible sheet member which connects to the seat or handle bars.

In accordance with yet another feature of the present invention, the protective cover includes a sheet storage assembly for conveniently storing the flexible sheet member when not in use. The seat storage member is preferably integrated onto the flexible sheet member by preferably stitching the storage member to the sheet member. The storage member can include a variety of types of connection members located at the peripheral edge of the storage member to close the edges of the storage member together. Such connecting members can include snaps, buttons and/or zippers. Preferably, zipper teeth are connected to the complete peripheral edge of the storage member and a zipper slide is attached to such zipper teeth to connect and disengage the zipper teeth to open and close the storage member respectively. The connecting of the sheet storage member directly onto the sheet member eliminates the need for two separate components for the user to have to keep track of when storing and unstoring the flexible sheet member. The storage member may also include a latch member which allows for connecting the storage member to the belt or keychain of a user. Alternatively, the latch member can be designed to allow the user to conveniently mount the storage member on the down tube or cross-bar of the bicycle. The compact arrangement of the flexible sheet member inside the sheet storage member also allows the user to conveniently store the protective covering in a bicycle bag.

The primary object of the present invention is to provide a protective covering for a bicycle which protects the seat and/or handle bars of the bicycle from the elements.

Another object of the present invention is to provide a protective covering which easily and securely connects to the bicycle seat and/or handle bars of a bicycle.

Yet another object of the present invention is to provide a protective covering which is water resistant and protects the handle bars and/or bicycle seat from becoming wet or dirty when not in use.

Still yet another object of the present invention is to provide a protective covering which can be secured to the bicycle and prevent an unauthorized user from easily removing such cover from the bicycle.

Another object of the present invention is to provide a protective cover which includes a sheet storage member which is integrated onto the flexible sheet member and is adapted to compactly and conveniently store the flexible sheet member when not in use.

These and other objects and advantages will become apparent to those skilled in the art upon reading and following the description taken together with the accompanying drawings.

BRIEF DESCRIPTION OF THE DRAWINGS

Reference may now be made to the drawings, which illustrate various embodiments of the invention that the invention may take in physical form and in certain parts and arrangement of parts wherein:

FIG. 5 is a cross-sectional view of the protective covering taken along line 5—5 of FIG. 3;

FIG. 6 illustrates the storing of the flexible sheet member into the sheet storage member of the present invention; and, FIG. 7 illustrates the sheet storage member in a closed position and containing the flexible sheet member.

DETAILED DESCRIPTION OF THE PREFERRED EMBODIMENTS

Figure 1:
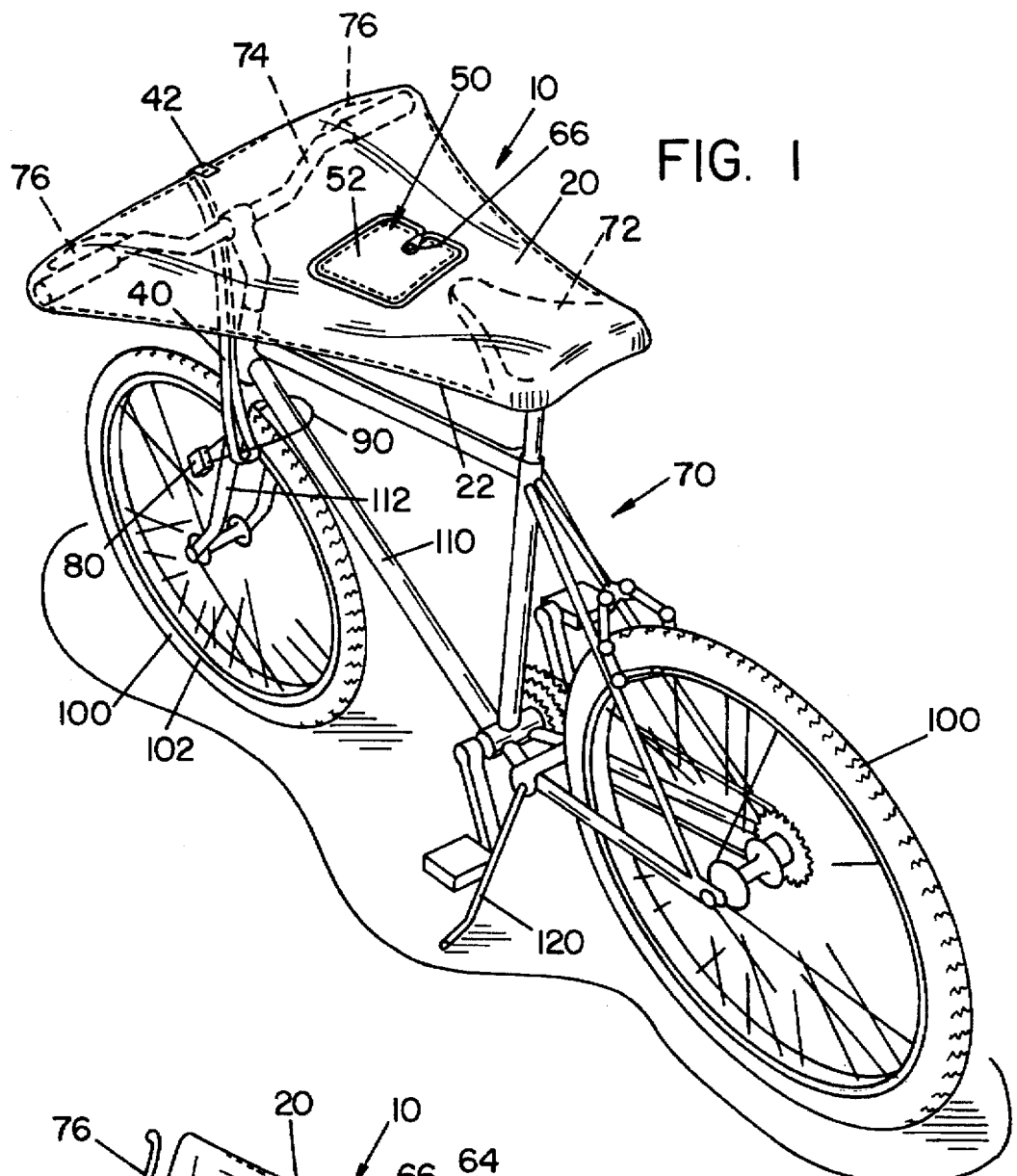
FIG. 1 is a perspective view of a bicycle and the protective covering attached to the bicycle seat, handle bars and hand brakes in accordance with the present invention.
Figure 2:
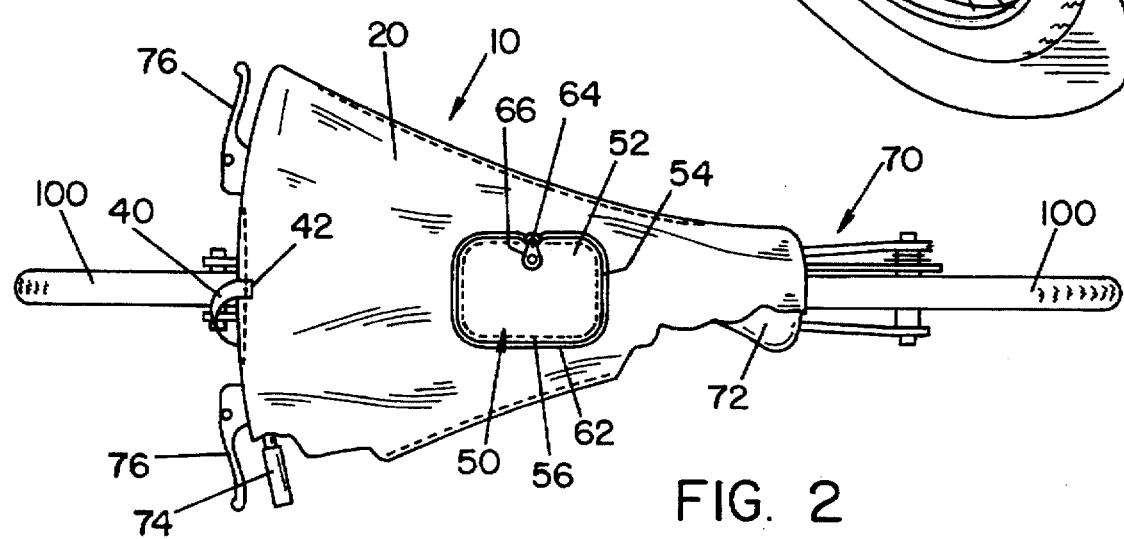
FIG. 2 is a top view of the bicycle and protective covering as illustrated in FIG. 1, partially in section, illustrating the protective covering attached to the bicycle seat and hand bars.
Figure 4:
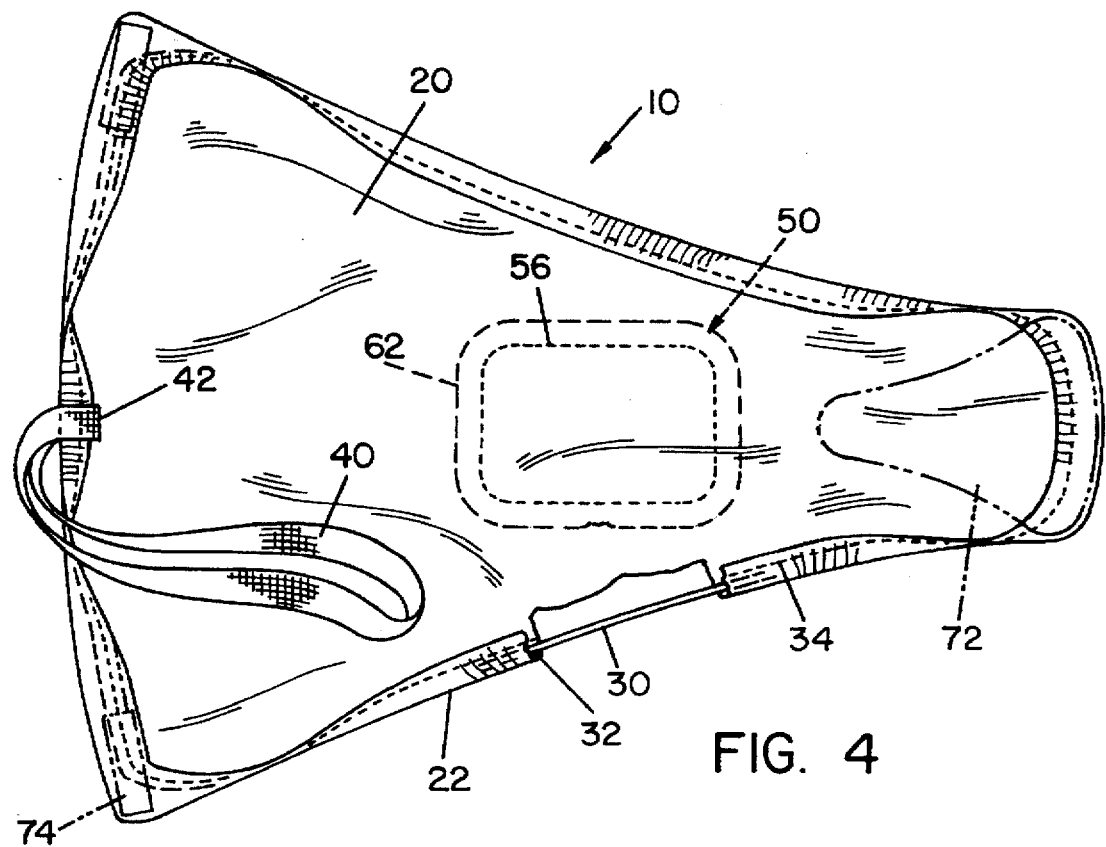
FIG. 4 is a bottom perspective view of the protective covering of FIG. 1, partially in section, illustrating the protective covering attached to the handle bars and seat of a bicycle.

Referring now to the drawings, wherein the showings are for the purpose of illustrating the preferred embodiments of the invention only and not for the purpose of limiting the same, in FIGS. 1, 2 and 4, there is shown a protective covering 10 covering seat 72 and handle bars 74 of bicycle 70. Bicycle 70 includes two tires 100 and is supported in its upright position by kickstand 120 when not in use. The protective covering 10 as shown in FIG. 1 is securely positioned onto seat 72, handle bars 74 and hand brakes 76, and provides protection against the elements. In FIG. 2, the protective covering is securely positioned onto seat 72 and handle bars 74. Protective covering 10 includes flexible sheet 20 which is preferably made up of a waterproof or resistent nylon or vinyl material. Flexible sheet 20 is designed to be water resistant so as to repel water from rain and/or snow from contacting seat 72 and/or handle bars 74. Flexible sheet 20 also reduces the amount of water from contacting components mounted on the seat, handle bars, hand brakes and other components of bicycle 70. Flexible sheet 20 has a thickness of about 1–10 mils. Such thickness allows the sheet to be easily positioned about the seat and handle bars of the bicycle and further allows the flexible sheet to be conveniently stored as will be described in detail below. Preferably, the thickness of the sheet is about 4–6 mils. As can be appreciated, flexible sheet 20 can incorporate various designs and colors to provide a variety of aesthetically pleasing displays to a variety of users.

Figure 3:
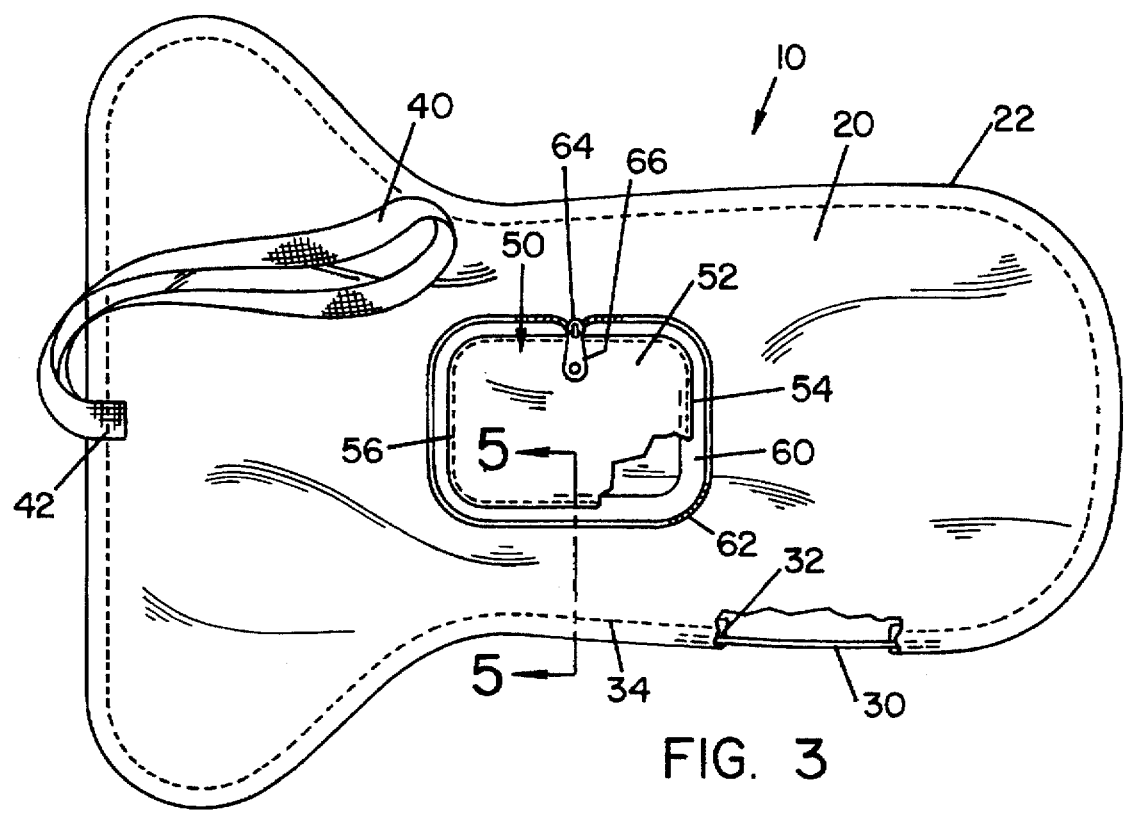
FIG. 3 is a perspective view of the protective covering of the present invention fully opened.

Referring now to FIG. 3, flexible sheet 20 includes a sheet peripheral edge 22 which defines the outer edge of flexible sheet 20. Elastic band 30 is positioned on peripheral edge 22. Preferably, elastic band 30 is a nylon band which is mounted to the peripheral edge of 22 by slightly overlapping peripheral edge 22 and stitching the edge to flexible sheet 20 by band stitching 34 as best illustrated in FIGS. 3–5. The stitching material is preferably a nylon thread. Such overlapping of the peripheral edge provides a band compartment 32 which maintains elastic band 30 in its proper location on peripheral edge 22. As shown in FIG. 3, elastic band 30 preferably extends about the complete peripheral edge 22 of flexible sheet 20. However, it can be appreciated that elastic band 30 can be strategically positioned on flexible sheet 20 in limited locations on peripheral edge 22 and still provide adequate mounting of flexible sheet 20 to bicycle 70.

Referring now to FIGS. 1, 3, 4 and 6, flexible sheet 20 includes strap 40 which is preferably mounted to the peripheral edge 22 of the flexible sheet. As shown in FIG. 3, strap 40 is stitched to peripheral edge 22 so as to rigidly secure strap 40 to flexible sheet 20. The stitching material is preferably a nylon thread. Strap 40 is preferably made up of a flexible nylon band which is resilient to cutting and tearing. However, the strap may be made of other flexible, cut resistant materials.

As shown in FIGS. 1–3, flexible sheet 20 preferably includes a storage pouch 50. Storage pouch 50 is preferably positioned at generally the center of flexible sheet 20 as shown in FIGS. 1 and 3. Storage pouch 50 includes a pouch lining 52 which is made of a flexible material which is similar to or the same as the material of flexible sheet 20. Pouch lining 52 is preferably water resistant to prevent liquid from penetrating the pouch and settling onto flexible sheet 20. Pouch lining 52 includes a peripheral edge 54. Peripheral edge 54 is attached to flexible sheet 20 by pouch stitching 56 as illustrated in FIG. 5. Preferably, peripheral edge 54 is stitched completely about the pouch peripheral edge. The stitching material is preferably a nylon thread. Storage pouch 50 also includes a zipper support 60 which is mounted between peripheral edge 54 and flexible sheet 20 as illustrated in FIG. 5. Preferably the zipper support is stitched to the storage pouch peripheral edge 54 and flexible sheet 20. The stitching material is preferably nylon thread. Zipper support 60 supports zipper teeth 62 positioned in a space relationship about zipper support 60. A zipper slide 64 is positioned on zipper teeth 62 and is designed to connect and disconnect zipper teeth 62 when the storage pouch 50 is opened and closed, respectively. A zipper tab 66 is connected to zipper slide 64 to provide for easily movement of the zipper slide 64 over zipper teeth 62. The zipper teeth are preferably made of a resilient plastic material or other corrosion resistant material. The zipper slide and zipper tab are preferably made of a corrosion resistant metal or plastic material. The zipper support is preferably made of a strong, flexible water resistant material such as nylon.

As illustrated in FIGS. 1–4, storage pouch 50 is positioned on the top side of flexible sheet 20. However, it can be appreciated that in another embodiment of the invention, not shown, the storage pouch can be positioned on the underside of flexible sheet 20. By positioning the storage pouch on the underside of the flexible sheet, the storage pouch is shielded by the flexible sheet from rain, snow and other elements when the flexible sheet is attached to the seat, handle bars and other components of the bicycle. Such a positioning of the storage pouch also allows more room for graphic or other visual presentations to be positioned on the top surface of the flexible sheet.

The operation of protective covering 10 will now herein be described. As illustrated in FIG. 7, protective covering 10 is collapsible in a convenient and easily transportable pouch when not in use. FIG. 7 illustrates flexible sheet 20 and strap 40 compactly and conveniently stored within storage pouch 50. Protective covering 10 in this mode can be easily stored in a bicycle bag or conveniently carried by the user when not in use. As can be appreciated, storage pouch 50 can include a connecting mount, not shown, such that the storage pouch can be connected to a user's belt buckle or a clip can be attached to the storage pouch such that the pouch can be clipped to the belt of a user or attached to a bicycle component for easy storage. Preferably, the connecting mount is a relatively small elastic loop which allows the user to hang the pouch on the handle bars or the like.

When protective covering 10 is to be used to protect the seat and handle bars of the bicycle, the user moves zipper slide 64 by pulling zipper tab 66. The movement of the zipper slide disengages zipper teeth 62 and opens the storage pouch to allow the user access to flexible sheet member 20 and strap 40. Once the storage pouch 50 has been opened, flexible sheet 20 is unfolded and positioned on seat 72 and handle bar 74 of bicycle 70. As illustrated in FIGS. 3 and 4, one end of flexible sheet 20 is preferably narrower than the other end of flexible sheet 20. The narrower end is preferably positioned over seat 72 and the wide end is placed over handle bars 74, hand brakes 76 and/or other components as illustrated in FIG. 1 or over handle bars 74 and/or other components as illustrated in FIGS. 2 and 4. The user secures flexible sheet 20 onto seat 72 by pulling peripheral edge 22 below the seat edge and releasing the flexible sheet. Elastic band 30 contracts and secures the peripheral edge 22 under the base of the seat as illustrated in FIG. 4. Similarly, flexible sheet 20 is secured to handle bars 74, hand brakes 76 and/or other bicycle components by pulling the peripheral edge 22 about handle bars 74 and releasing flexible sheet 20. Elastic band 30 contracts and secures the peripheral edge 22 of flexible sheet 20 about the handle bars, hand brakes and/or other bicycle components. As best illustrated in FIGS. 1 and 4, the elastic band is designed to sufficiently contract and pull the flexible sheet member relatively taunt about the seat and handlebars and/or hand brakes. The elastic band design further allows for the flexible member to be sized large enough to accommodate a variety of bike sizes and designs and ensures that the flexible sheet is fitted relatively taunt about the seat and handlebars and/or hand brakes of the bicycle. The reality taunt fit provided by the elastic band also reduces the likelihood the flexible sheet will be blown off the bicycle.

Once flexible sheet 20 is placed onto the bicycle seat and handle bars and/or hand brakes of the bicycle, the user secures flexible sheet 20 to the bicycle by placing security cord 90 through strap 40 and locking the security cord by lock 80 to bicycle 70. As illustrated in FIG. 1, security cord 90 is positioned through tire spokes 102 on tire 100 and about down tube 110, through strap 40, about fork 112. The two ends of security cord 90 are then attached together by lock 80. As can be appreciated, the strap can be secured to the bicycle in other ways. Securing strap 40 to bicycle 70 prevents protective covering 10 from being separated from bicycle 70 when protective covering 10 is inadvertently blown off of seat 72 and handle bars 74. Furthermore, the securing of protective covering 10 prevents an unauthorized user from easily removing the covering from bicycle 70.

When the user once again intends to use the bicycle, the user releases strap 40 from security cord 90 and removes flexible sheet 20 from seat 72 and handle bars 74 and/or hand brakes 76. Flexible sheet 20 and strap 40 are once again stored within storage pouch 50 by the user partially moving zipper slide 64 about zipper teeth 62 of storage pouch 50 until storage pouch 50 is partially closed as illustrated in FIG. 6. The user then directs flexible sheet 20 and strap 40 into the interior of storage pouch 50 by the user using one or more fingers A to direct the flexible sheet and strap into the interior of storage pouch 50. Once the flexible sheet 20 and strap 40 have been inserted in storage pouch 50, zipper slide 64 is moved to its completely closed position as illustrated in FIG. 7.

The invention has been described with reference to a preferred embodiment and alternates thereof. It is believed that many modifications and alterations to the embodiments discussed herein will readily suggest themselves to those skilled in the art upon reading and understanding the detailed description of the invention. It is intended to include all such modifications and alterations insofar as they come within the scope of the present invention.

I claim:

1. A protective covering for a bicycle comprising:
   a) a flexible sheet member adapted to cover the seat and handle bars of the bicycle, said flexible sheet made of a water resistant material and having a peripheral edge;
   b) an elastic member attached to said peripheral edge of said flexible sheet for connecting said flexible sheet to said seat and handle bars of said bicycle; and,
   c) a security strap attached to said peripheral edge of said sheet member for providing a means for lockably securing said sheet member to said bicycle.

2. A protective cover as defined in claim 1, wherein said sheet member includes a plastic material having a thickness of about 1–10 mils.

3. A protective cover as defined in claim 2, wherein said elastic member is continuous and surrounds said flexible sheet member at said peripheral edge of said flexible sheet.

4. A protective cover as defined in claim 1, wherein said elastic member is continuous and surrounds said flexible sheet member at said peripheral edge of said flexible sheet.

5. A protective cover as defined in claim 4, including sheet storage means attached to said sheet member for compactly storing said sheet member.

6. A protective cover as defined in claim 1, including sheet storage means attached to said sheet member for compactly storing said sheet member.

7. A protective cover as defined in claim 6, wherein said sheet storage means comprises a zipper forming a closed pouch enclosing said cover when engaged and lying substantially flat when disengaged.

8. A protective cover as defined in claim 6, wherein said flexible sheet, elastic member, strap and storage means are made of corrosion resistant materials.

9. A protective cover as defined in claim 1, wherein said flexible sheet member includes two ends, one of said ends having a width which is larger than the other of said ends.

10. A protective cover as defined in claim 9, wherein said end having the larger width is designed to fit over said handlebars.

* * * * *